March 31, 1959 R. O. PETERSON 2,879,631
BRUSHING TOOL AND METHOD OF MANUFACTURE
Filed June 16, 1951 5 Sheets-Sheet 2
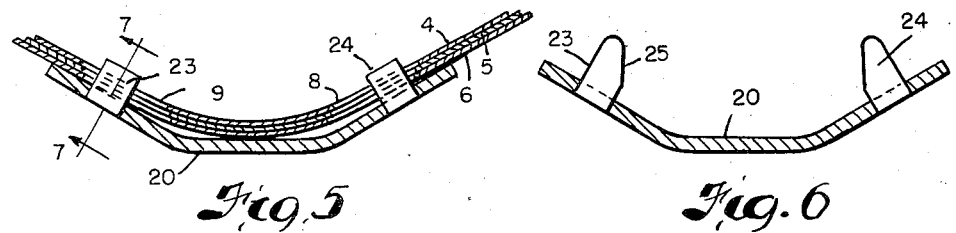
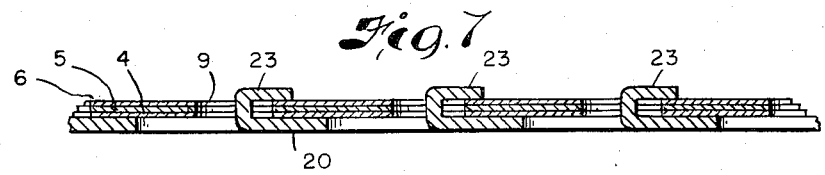
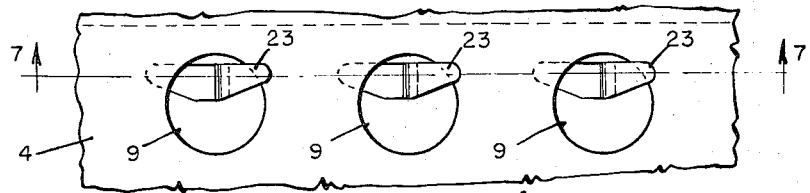
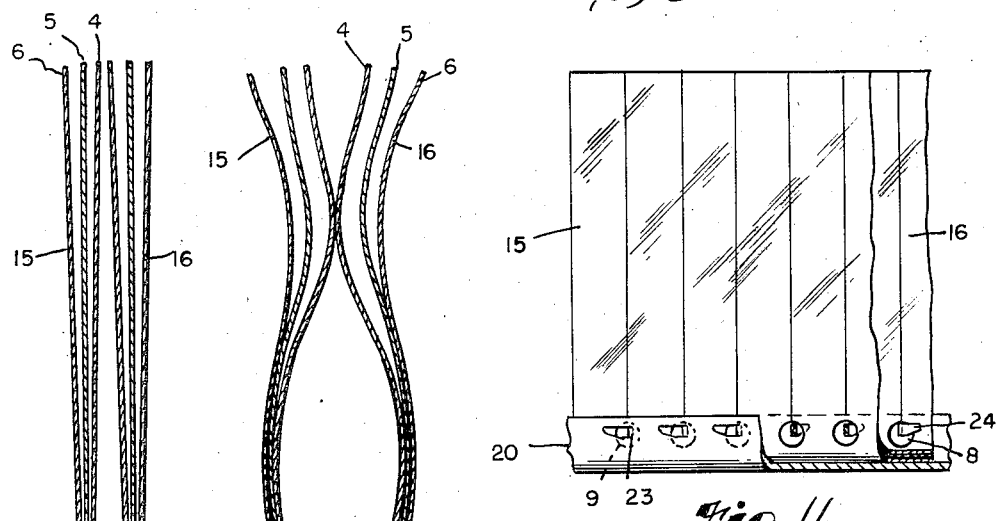
INVENTOR.
RUBEN O. PETERSON
BY
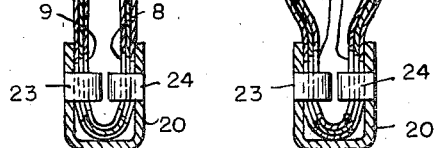
ATTORNEYS.

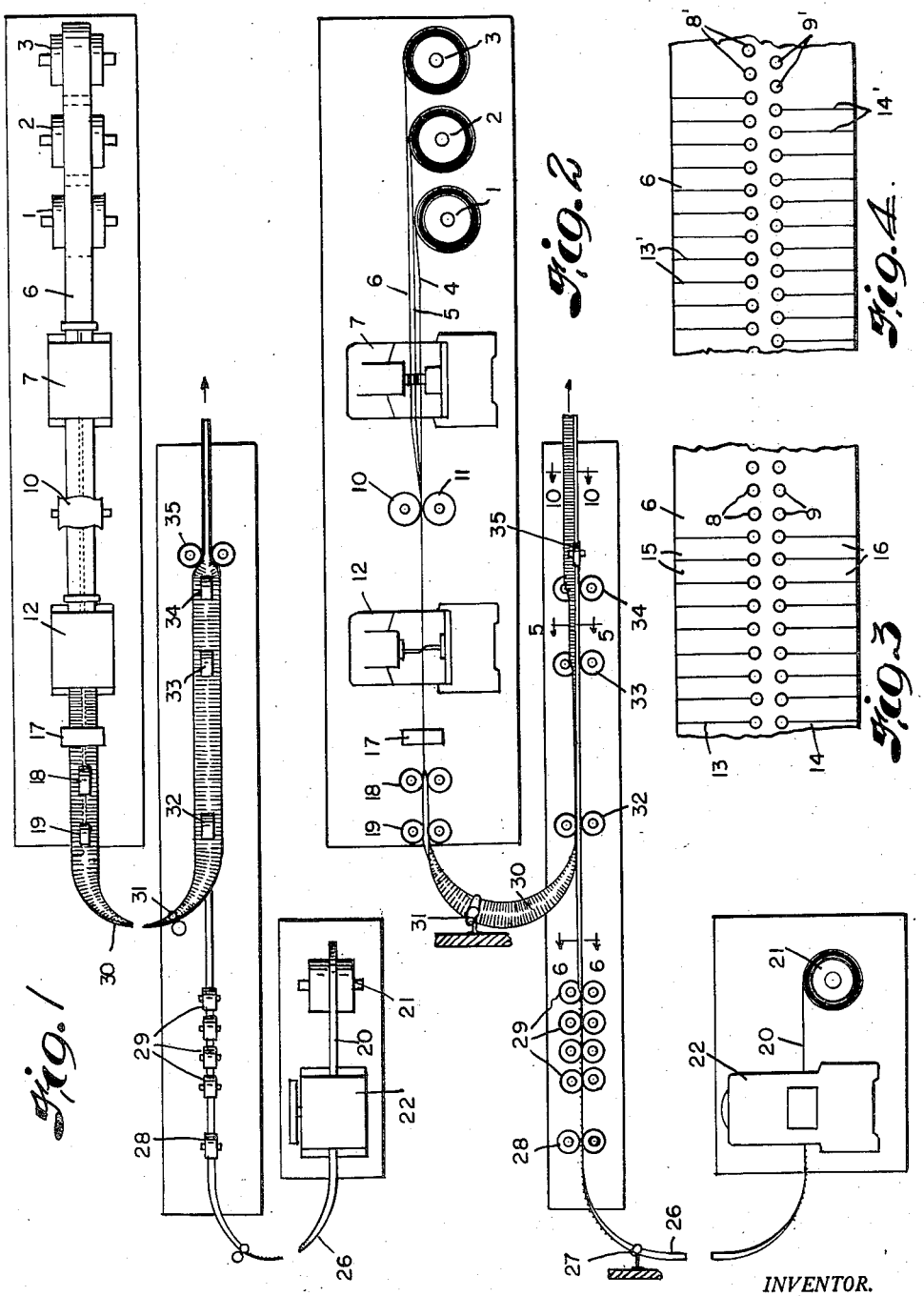

March 31, 1959 — R. O. PETERSON — 2,879,631
BRUSHING TOOL AND METHOD OF MANUFACTURE
Filed June 16, 1951 — 5 Sheets-Sheet 3

INVENTOR.
RUBEN O. PETERSON
BY
Oberlin & Limbach
ATTORNEYS.

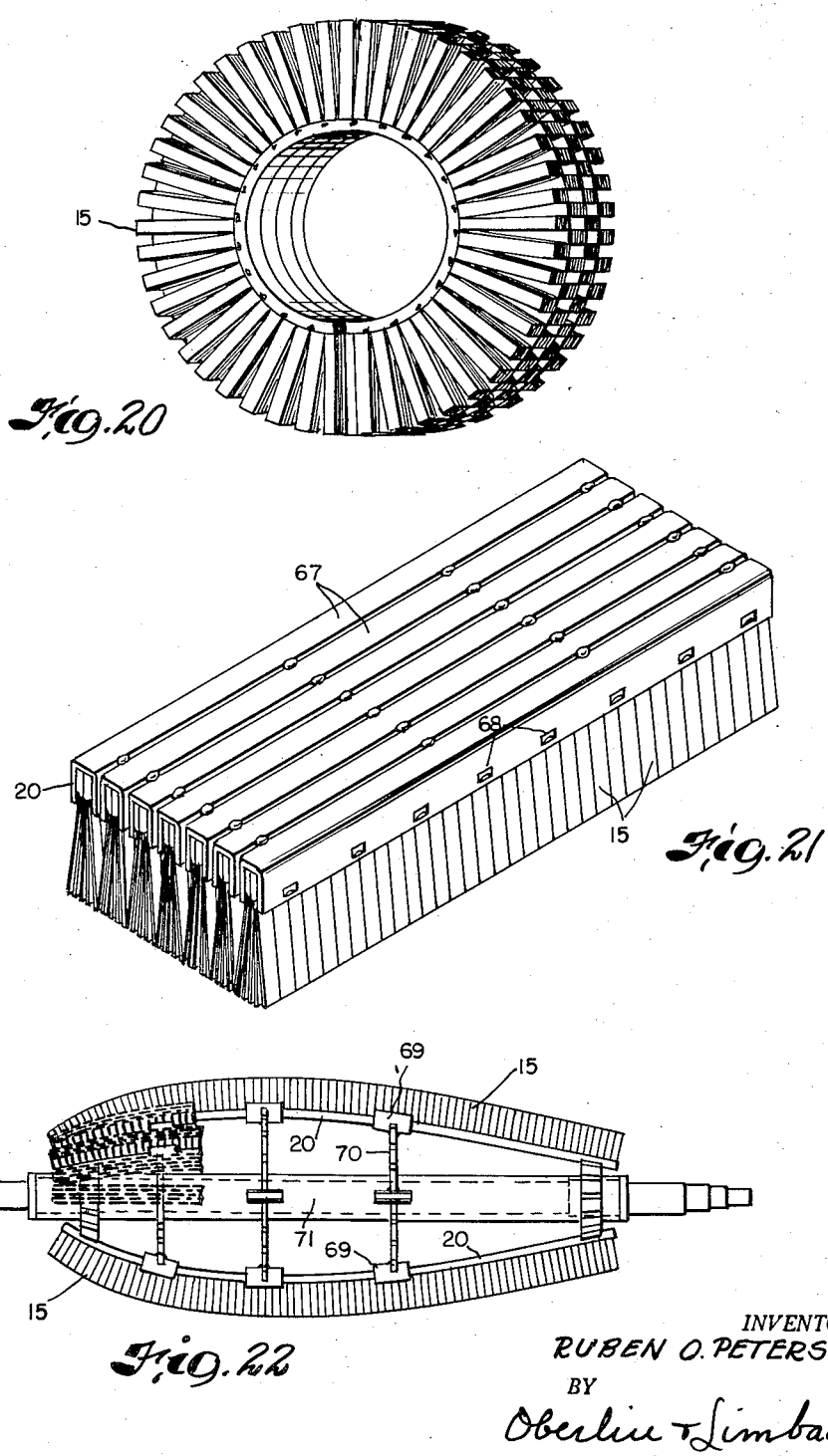

March 31, 1959 R. O. PETERSON 2,879,631
BRUSHING TOOL AND METHOD OF MANUFACTURE
Filed June 16, 1951 5 Sheets-Sheet 5
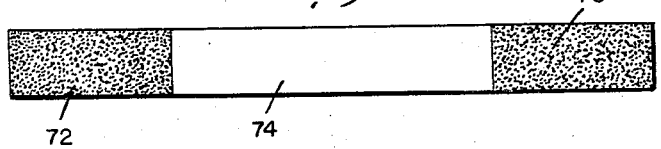
Fig. 23
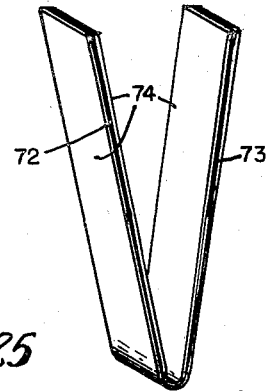
Fig. 24
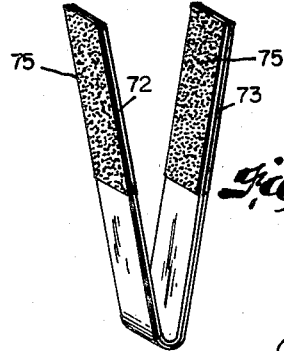
Fig. 25
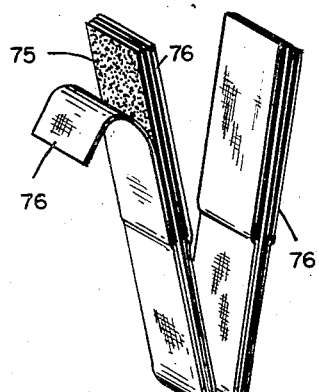
Fig. 26
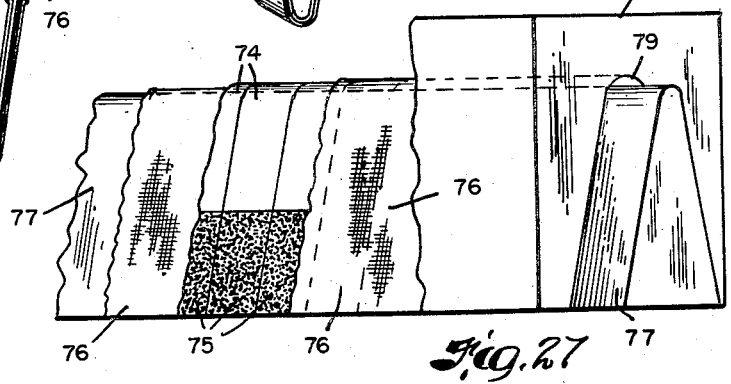
Fig. 27
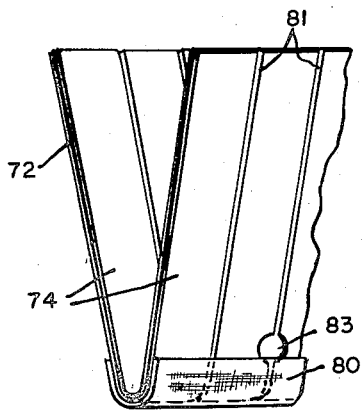
Fig. 28
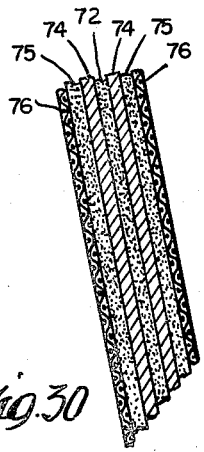
Fig. 30
Fig. 29
INVENTOR.
RUBEN O. PETERSON
BY
Oberlin & Limbach
ATTORNEYS.

United States Patent Office 2,879,631
Patented Mar. 31, 1959

2,879,631

BRUSHING TOOL AND METHOD OF MANUFACTURE

Ruben O. Peterson, University Heights, Ohio, assignor to The Osborn Manufacturing Company, Cleveland, Ohio, a corporation of Ohio Application June 16, 1951, Serial No. 232,036

31 Claims. (Cl. 51—185)

This invention relates as indicated to a novel brushing tool and method of manufacturing the same, and more particularly to a brushing tool utilizing novel brush material.

In the manufacture of brushes and brush elements comprising a brush back having bristles or the equivalent extending therefrom, filamentous or stranded materials have ordinarily been employed to form such bristles, including vegetable fibers such as Tampico fiber, horsehair, wire and synthetic plastic monofilaments and strands such as nylon. By selecting the particular bristle material to be employed and controlling the length, density, etc., of such bristles as mounted in the brush back, it has been possible to obtain a wide variety of brushing characteristics, but there are nevertheless various materials not available in filamentous or stranded form having characteristics highly desirable for certain types of brushing operations and it has not in the past been possible to utilize the same. Furthermore, the handling of the bristle material has in the past generally been a rather laborious, expensive and inexact operation in the manufacture of brushes, particularly when bundles of such bristles cut to length must be properly distributed for securing in the elongated channelform back of brush strip of the type now comprising an important portion of the brush industry. After the various brush elements have been assembled, it is customary practice to trim the bristle material to an even length to provide a uniform brush face inasmuch as it is very difficult initially to assemble brush elements with the bristle material extending uniformly therefrom. The amount of waste of expensive bristle material in this manner is frequently very consequential.

Certain metals and alloys having unusual characteristics are commercially available in sheet or strip form but are not available in the form of wire suitable for brush material. This is, for example, the case with certain austenitic steels such as Hadfield steel which contains approximately 14% manganese, as well as various spring metal stocks. Hadfield steel is, however, commercially available in thin sheets of from about .005 to .020 inch in thickness, and it is a principal object of my invention to provide a novel brush structure and method of assembling the same adapted to utilize such sheet material as brush material, this for the reason that Hadfield steel and certain other like materials are of unusual hardness making the same especially suitable for certain severe brushing operations. Moreover, sheet materials are in general considerably less expensive of manufacture than corresponding filamentous materials, particularly when the latter must be produced by repeated drawing through numerous dies.

Another object of my invention is to provide a method of manufacturing brushing tools utilizing sheet material of many types as the brush material.

Still another object is to provide a method of continuously manufacturing a brush element in which the latter is produced by the assembling together of a continuous elongated back element and a continuous strip of my novel brush material.

A further object is to provide a novel brushing tool capable of a brushing action previously not obtainable and adapting the same to a variety of novel brushing operations.

Other objects of my invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 1 is a diagrammatic top plan view of an assembly line for the preliminary processing and assembling of the brush material and brush back components of my new tool;

Fig. 2 is a diagrammatic side elevational view corresponding to Fig. 1;

Fig. 3 is a fragmentary top plan view of a length of strip material in course of being processed prior to assembly with the back element;

Fig. 4 is a view generally similar to Fig. 3 but showing a modification of the same;

Fig. 5 is a transverse sectional view taken on the line 5—5 on Fig. 2 through the assembled and partially formed brush element;

Fig. 6 is a similar transverse sectional view taken along the line 6—6 on Fig. 2 through the partially deformed back element prior to assembly of the latter with the brush material;

Fig. 7 is a longitudinal sectional view through the assembled back element and brush material taken on the lines 7—7 on Figs. 5 and 8;

Fig. 8 is a fragmentary plan view illustrating the manner of assembling the brush material to the back element;

Figs. 9 and 10 are sectional views taken through the completed brush element on the line 10—10 in Fig. 2, Fig. 9 showing the brush material uncrimped and Fig. 10 showing an identical construction but with the brush material crimped;

Fig. 11 is a side elevational view, partly broken away to disclose the internal construction, of a length of brush strip produced in accordance with my invention;

Figure 16:
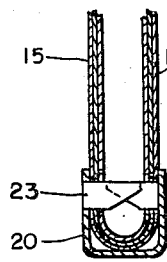
Fig. 16 is a transverse sectional view of the finished brush strip resembling Fig. 9 but with the brush material retaining teeth unbent.
Figure 17:
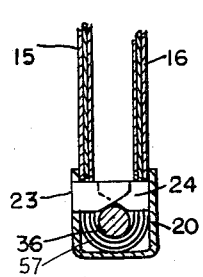
Figure 18:
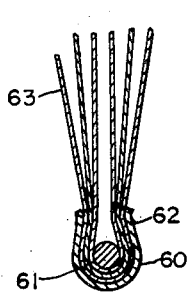
Figure 19:
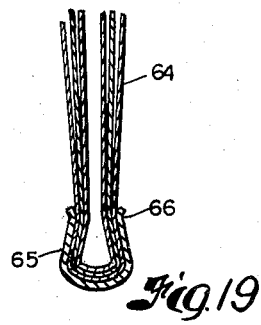

Fig. 17 resembles Fig. 16 but with the additional employment of an elongated retaining element such as a wire held beneath the teeth;

Fig. 18 is a transverse sectional view of another form of finished brush strip comprising a channel back having a constricted neck or opening and an elongated retaining element such as a wire holding the special brush material therein;

Fig. 19 is a transverse sectional view of a channelform brush back similar to that of Fig. 18 but with the brush material retained therein by its own spring action and the constricted neck of the channel;

Fig. 20 is a perspective view of a helical rotary brush element formed of my new brush strip;

Fig. 21 is a perspective view of a flat brush utilizing straight lengths of my new brush strip;

Fig. 22 is a fragmentary elevational view of a contoured rotary brush utilizing lengths of my new brush strip extending generally parallel to the axis of such brush;

Fig. 23 shows a flat strip of material having abrasive adhered to its flat outer end portions;

Fig. 24 shows two strips of the Fig. 23 type deformed and bonded together;

Fig. 25 resembles Fig. 24 but with the assemblage plastic-coated and with abrasive adhered to the outer faces of the finger elements as well as the opposed faces;

Fig. 26 resembles Fig. 25 but with layers of plastic-impregnated fabric adhered to the surfaces of the composite fingers;

Fig. 27 illustrates the manner in which composite brushing elements of the Fig. 26 type may be assembled and bonded together;

Fig. 28 illustrates a plurality of elements of the Fig. 24 type joined together by continuous plastic-impregnated fabric in the region of their deformation only;

Fig. 29 is a perspective view of an assemblage of composite fingers interconnected by continuous plastic-impregnated fabric layers bonded to both sides of such fingers; and Fig. 30 is an enlarged fragmentary cross-section through a composite finger of the Fig. 29 type showing the laminated form of the same.

In my prior Patent No. 2,303,386 I describe a form of brush strip in which bristle material or the like is retained in a channelform back beneath an elongated retaining element such as a wire which is in turn firmly secured within such channel by means of teeth punched in from the respective channel sides. In accordance with the present invention I perform certain preliminary operations upon a (preferably) continuous strip of sheet material in order to adapt the same to be secured within a channelform back generally resembling that illustrated and described in my aforesaid patent. It is believed that the manner of preparing and assembling the components of my new brushing tool and the arrangement of apparatus for such purpose may best be understood by first generally describing the operation of such apparatus, having particular regard to Figs. 1 and 2 of the drawing.

A plurality of reels 1, 2 and 3 of strip material 4, 5 and 6 are mounted on parallel axes so that such strip material may be withdrawn therefrom in superimposed relation and conducted to a multi-tier piercing press 7 adapted to punch two parallel rows of holes 8 and 9 (Fig. 3) through such strip longitudinally thereof slightly spaced to the respective sides of the longitudinal center line of the strip. The superimposed layers (in this case three) of the strip material (thin spring steel strip, for example) may next be conducted between a pair of crimping rolls 10 and 11 which are, however, optional depending on the characteristics desired in the finished brush material and then to a slitting press 12 adapted to cut two rows of slits 13 and 14 extending outwardly from holes 8 and 9 respectively to the corresponding side edges of the strip (Fig. 3). While such holes and slits may be directly opposite one another as shown in Fig. 3, it may on occasion be desirable for reasons explained below to offset slits 13 slightly relative to slits 14, the holes 8 and 9 being sufficiently large to accommodate a degree of offset of such slits without re-positioning the same. The punching and slitting operations may be performed simultaneously, if desired, and this will in fact be preferred when the two rows of slits are to be staggered. As shown in Fig. 4, however, holes 8' may, if desired, be offset relative to holes 9' with a corresponding offset of slits 13' and 14'. Ordinarily, the strip will merely be slit as indicated, but it may instead be slotted with narrow slots corresponding to such slits but representing the actual removal of material so that the flat fingers 15 and 16 produced thereby will be slightly laterally spaced for more free interaction therebetween. Certain of the sheet materials suitable for employment in accordance with my invention are deformed only with difficulty and require to be preheated in the region of intended deformation. For this purpose, I next provide in the sequence of apparatus through which the strips progress an optional heating unit 17 which may be of the electric induction type where appropriate or simply an oven, for example, particularly designed to heat the central portion of the strip in the region between the longitudinally extending rows of holes 8 and 9.

The superimposed strips now pass between sets of bending or forming rolls 18 and 19 adapted to deform the strip in such central portion to shape the same to a shallow rounded V-shaped cross-section whereupon such strips are now ready to be assembled to the partially preformed continuous channelform back element.

Such back element may be formed from a length of relatively narrow steel strip 20 withdrawn from a reel 21 and conducted through a punch press 22 adapted to form two rows of spaced teeth 23 and 24 projecting from the same side of strip 20 and preferably shaped as taught in my above-mentioned Patent No. 2,303,386. Thus, such teeth may have straight outer edges and opposed beveled inner edges 25 (Fig. 6). Such opposed teeth may desirably be very slightly offset relative to one another, but it is to be understood that such offset as well as the precise shape of the teeth is optional in the present construction and not of such importance as in the construction disclosed in my Patent No. 2,303,386. A slack loop 26 of the punched strip material is supported by a floating roller 27 in well-known manner adapted to accommodate an increase or decrease in supply during operation of the apparatus and the drive means (not shown) for such apparatus may be regulated thereby likewise in well-known manner to maintain the size of such loop within desired limits. Strip 20 now passes between pinch rolls 28 and forming rolls 29 adapted to shape such strip to a shallow channel as shown in Fig. 6 corresponding to the shape of the superimposed slit strips 4, 5 and 6 where the latter leave rolls 18 and 19. Teeth 23 and 24 are spaced both longitudinally and transversely to enter corresponding holes 8 and 9 of such latter strips.

Such superimposed strips on leaving pinch rolls 19 are likewise formed into a loop 30 supported by floating roll 31 controlled in the same fashion as loop 26 and such superimposed strips are juxtaposed to the preformed backing strip 20 with teeth 23 and 24 protruding through the generally aligned holes 8 and 9 in such superimposed strips, such complete assembly passing between pinch rolls 32. The assembled strips now pass between opposed rolls 33 adapted to flatten or flange over such teeth 23 and 24 as shown in Figs. 5, 7 and 8 firmly to secure the superimposed strips 4, 5 and 6 to the continuous back element 20. Further forming rolls 34 and 35 now shape element 20 into the generally U-shaped channelform back shown in section in Figs. 9 and 10 with the fingers 15 and 16 extending therefrom in the form of a generally flat layer.

Brush strip produced as above described will normally be rather rigid and may be cut to appropriate lengths for mounting on annular hubs, for example, with the elongated channelform back elements 20 disposed generally parallel to the axis of the resultant rotary assembly and with the brush material 15, 16, extending generally radially therefrom. Such lengths of brush strip may, moreover, be bent to long lead helical conformation and similarly mounted for use as a rotary brush. When the sheet material such as 4, 5 and 6 is unusually flexible in character, it is even possible to circularize the resultant brush strip in conventional manner, although usually about a relatively large diameter to form annular or helical rotary brush elements or units of well-known type.

It will, of course, be understood that the number of layers of sheet material to be slit and utilized as brush material may be varied as occasion requires, and with particular regard to the thickness of such sheet material and the flexibility of the same. Instead of using substantially continuous lengths of such sheet material, it will likewise be appreciated that relatively short lengths of the same may be sequentially processed through the above-described apparatus. The individual units employed to process the strip material, including the brush back element 20, are all of a type generally well known in the art and hence require no detailed description. Such units may be arranged in substantially straight line sequence if desired without any alteration in the general direction of travel of the brush components shown in Figs. 1 and 2. If only short lengths of brush strip are to be produced at a time, a large punch press may be utilized to punch all the holes and cut all the slits simultaneously, and the components assembled with the aid of generally similar apparatus.

As above indicated, one principal advantage of my new brush construction and method of assembling the same resides in the fact that certain sheet materials and particularly metal sheet materials may be utilized as the brush material when wire of the same composition is either not available or is too expensive to be commercially practicable. One example of such material is Hadfield steel which has a chemical analysis including approximately 1.25% carbon and between 13 and 15% manganese, with the remainder being iron, the usual impurities, and the usual minor additives. Small amounts, on the order of .2–2.0% molybdenum or .5–2.5% vanadium may be included to increase the hardness and fatigue strength. About 1% of titanium may also be added for the same purpose and also to reduce the inherent grain size. Such steel has recently become available in thin sheet and strip form and has certain qualities useful in brushes for certain purposes including impact strength, hardness and wear-resistance. Not only may it have a normal Rockwell C hardness of from about 50–55, and even as high as 60–65, but additionally the impact of the ends of the brushing fingers 15 and 16 with the work tends still further locally to harden the same. Such local work-hardening may raise the tips of such fingers to a hardness of over 60 Rockwell C, and heating to a temperature of about 500° F. is effective to develop a hardness of about 65 Rockwell C. For this reason, my new brushing tool employing such material may be used to operate on hot metal billets, rod, or strip, for example, and the work-engaging tips of the fingers caused to achieve tool steel hardness. Since such extreme hardness may be only local, the fingers in general need not become overly brittle or tend to fracture prematurely. Furthermore, since it may thus be developed in use, the special treating operations which would otherwise be required periodically to renew such tip hardness are unnecessary. Such steel has not been generally available in the form of wire in sizes suitable for use as brush material due to difficulty in drawing and even if successfully drawn would probably cost several dollars a pound as opposed to the sheet form which is available in thicknesses of, for example, .010 inch at a much lower cost. Reference may be had to Metals Handbook, 1948 ed., The Am. Society for Metals, pp. 526–534, for a more detailed discussion of austenitic manganese steel (Hadfield steel).

Even when materials are available alternatively in strip or filament form, it is often advantageous to employ the former due to lower cost and ease of continuous assembly with the brush back element employing commercially available equipment. A somewhat modified brushing and scraping action is obtainable in contrast to the usual wire. Not only may certain spring steel sheet material be thus utilized, but also various other types of sheet material including woven fabrics which may be impregnated or coated with natural or synthetic plastics including rubber and nylon, for example. Layers of different sheet materials may be assembled together in order to obtain a composite action on the work. When fabric or plastic sheet materials are utilized, they may have granular abrasives adhered thereto and be assembled into the channelform brush back to form internal layers with sheet metal fingers extending to each side thereof to support the same. Thus, for example, having reference to Figs. 1 and 2 of the drawing, the intermediate strip 5 may comprise such treated textile material with the other two layers 5 and 6 being of metal strip. Not only are such fabric or textile materials adapted to hold abrasive and to supply the same to the brush face, but also they are of assistance in damping vibration of the sheet metal fingers. To protect the metal fingers from corrosion as well as to damp vibration of the same in use, such fingers may be coated with a plastic such as rubber (if operating temperatures are not too high), neoprene (polychloroprene), Hycar (modified copolymers of butadiene and acrylonitrile), nylon (polyamide resins), vinyl plastics (vinyl polymers and copolymers), and melamine resins (melamine-formaldehyde reaction products). It may on occasion also be desirable similarly to coat the back element of the brush strip to protect the same from corrosion although, of course, it will not be subjected to the rapid flexing which the fingers undergo in use. As shown in Fig. 10 and mentioned above, such metal fingers may be crimped if desired to afford a brush face of somewhat greater width as well as to reduce concentrations of stress resulting from flexing and vibration in use. In order that all such fingers may protrude an equal distance from the brush back, the original strips such as 4, 5 and 6 may be of slightly different widths to compensate for the fact that they will be in effect nested within the brush back (Figs. 9 and 10).

If the slits 13 and 14 are slightly staggered or offset, resultant fingers of the different layers of brush material in the finished article will tend somewhat to support one another in use. The holes 8 and 9 not only afford openings for insertion of the teeth therethrough, but also provide radii at the ends of the slits or slots tending to prevent concentrations of stress in these regions. Of course, where slots are provided rather than simple slits, it will not always be necessary thus to punch such holes since if such slots are of sufficient width and are similarly rounded at their inner ends the same results will be obtained. In one embodiment of my invention using steel strip as the brush material, I have found it satisfactory for certain purposes to space such slits from about ¼ inch to about 1 inch apart with the resultant flat fingers protruding approximately 3 inches from the brush back. Depending upon the brushing action desired, however, it will be obvious that a wide range of such dimensions may be selected. The strip 20 from which the elongated channelform brush back is produced will ordinarily be of relatively heavy gauge compared to the steel strip, for example, which may be utilized as the brush material. Due to the manner in which the teeth 23 and 24 lock the brush material in place, it will be apparent that my new brush strip may be cut into desired lengths without any concern as to possible loss of brush material therefrom, this being in contrast to some forms of prior art brush strip where there is a distinct danger of loss or shedding of the brush bristle material at such severed ends. While in the continuous production of brush strip as above described I may frequently prefer to bend over the teeth in the manner illustrated in Figs. 5, 7 and 9 for example, it is nevertheless ordinarily entirely feasible to produce brush strip in accordance with my invention with such teeth merely projecting inwardly toward one another from the respective sides of the channelform back as shown in Fig. 16. On the other hand, when relatively short straight lengths of my new brush strip are to be produced individually, it is of considerable assistance to bend over the teeth as shown in Fig. 5 to secure the several components of the assembly together while such assembly is being transferred to the final forming means.

It is, of course, feasible and sometimes desirable especially when employing brush material formed from strips of fabric or the like also to utilize an elongated retaining element such as wire 36 secured beneath teeth 23 and 24 as shown in Fig. 17, in the same general manner as taught in my afore-mentioned prior patent 2,303,386.

Figure 12:
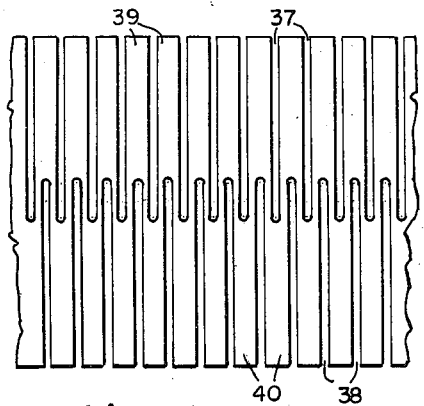
Figs. 12 to 15 are plan views of lengths of strip material generally similar to Figs. 3 and 4 but showing the transverse slits extending beyond the longitudinal center-line.

The rows of slits or slots in the side edges of the strip material and more particularly metal strip material which I may utilize in my novel brush construction may, when staggered, extend beyond the longitudinal center line of such strip as illustrated in Figs. 12-15 inclusive of the drawing with certain additional advantages accruing therefrom. Referring more particularly to Fig. 12 of the drawing, the strip of flat sheet material such as Hadfield steel strip is shown with rows of slots 37 and 38 cut therein with such slots of the respective rows staggered relative to one another and extending beyond the longitudinal center line of the strip so that such respective rows of slots overlap. Such strip material may be assembled into a completed brush element in the manner illustrated in Figs. 1 and 2 with the teeth 23 and 24 of the channelform back 20 projecting through corresponding slots to secure the brush material in such back element with the flat fingers 39 and 40 extending therefrom in the same manner as fingers 15 and 16. If slots 37 and 38 are of substantial width, it may additionally be desirable to employ an elongated retaining element such as 36 (Fig. 17). Brush strip formed in this manner has the advantage of facilitating circularization with the brushing fingers extending generally radially in the manner illustrated in Fig. 20, for example, as well as somewhat spacing adjacent fingers for freer relative movement under conditions of use.

Figure 13:
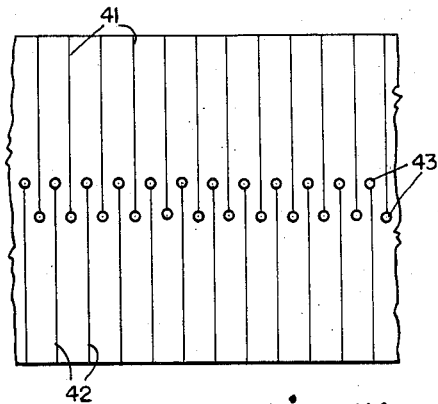

Fig. 13 illustrates a similar arrangement except that the strip of sheet material is slit transversely inwardly from its respective edges with the slits 41 and 42 extending beyond the longitudinal center line of the strip and therefore overlapping as shown. Such strip material may be employed in the same general manner as the material illustrated in Figs. 3 and 4 and will facilitate circularization of the resulting brush strip although not to the extent of the Fig. 12 form. The slits will desirably terminate in holes 43 to permit insertion of the inwardly protruding teeth 23 and 24 of the channelform brush back, it being noted that the teeth on one side of such back will enter holes 43 communicating with slits which extend to the edge of the strip material adjacent the opposite side of the brush back. When slots or slits are thus provided which extend transversely of the brush back and terminate at the other side thereof, there is considerably less tendency to develop concentrations of stress at the inner ends of such slits than in the Fig. 3 form, for example.

Figure 14:
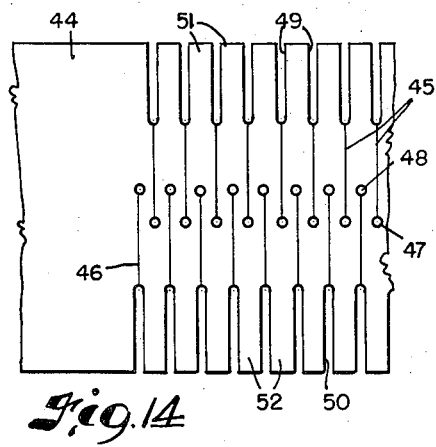

Fig. 14 illustrates yet another form of strip 44 punched, slit and slotted to afford certain modified characteristics. The two rows of slits 45 and 46 extend beyond the longitudinal center line of the strip and terminate in holes 47 and 48 respectively as in the Fig. 13 embodiment. The outer portions of such slits, however, are widened to provide slots 49 and 50 so that the resultant brushing fingers 51 and 52 are permitted a greater degree of relative freedom of movement adjacent the brush face.

Figure 15:
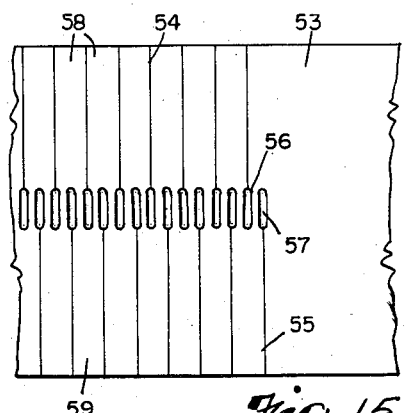

The Fig. 15 embodiment is in a sense the reverse of the Fig. 14 construction inasmuch as the strip 53 is slit inwardly from its respective edges to form two staggered rows of slits 54 and 55 terminating in slots 56 and 57 extending beyond the longitudinal center line of the strip. When brush strip is formed utilizing such brush material and then bent or circularized about a radius with the brushing fingers 58 and 59 extending generally radially as shown in Fig. 20, for example, such fingers will afford the maximum obtainable density at the brush face while at the same time the width of the slots 56 and 57 facilitates such circularization and permits insertion of the teeth 23 and 24.

It may be noted that in certain of the foregoing constructions the teeth 23 and 24 may not directly overlie an uninterrupted portion of the brush material. Where the brush material is of spring steel, for example, it will ordinarily be found that the same will nevertheless be securely retained within the brush back. Where relatively flexible brush material is utilized, however, it will frequently be desirable also to employ an elongated retaining element such as wire 36 secured beneath such teeth to hold the brush material in place.

Referring now to Figs. 18 and 19 of the drawing, if my new brush material is of non-spring stock, whether metal or rubberized fabric for example, the same may be secured within the sheet metal channel member 60 by coaction of an elongated retaining member such as wire 61 and a constricted neck 62 of such channel. The extreme edge portion of the channel will preferably be recurved outwardly to reduce concentration of stress of the brush material 63 at this point. When utilizing spring stock 64, however, the latter may be secured within a similar channel 65 by its own resilient action, such channel similarly being provided with a constricted neck 66. The strip of material such as Hadfield steel from which such brush material 64 is formed should be dished or formed to rounded V-shaped transverse section along its longitudinal center line as explained above before being thus assembled into the channelform back 65. Such back 65 should also be of relatively heavy gauge in order to retain its shape and hold the material 64 in flexed condition as illustrated in Fig. 19.

The strip material of which the channelform back is formed may be of other materials than steel, including Monel metal, silicon bonze, etc., depending upon the particular conditions of use to be encountered.

As shown in Fig. 20, brush strip produced in accordance with my invention utilizing appropriate brush material may be circularized into a plurality of helical convolutions, for example, or a single such turn may be utilized as an annular brush element. When thus circularized, and particularly when the radius of circularization is relatively small, it will be desirable to utilize brush material in which the brushing fingers are formed as shown in Figs. 12-15 inclusive to facilitate such circularization if metal brush material is employed. This is likewise the case if the brush strip is to be bent with the brushing fingers extending in a direction other than radially of the bend, as when circularized to form a cup brush with the axis of circularization generally parallel to such brushing fingers.

As shown in Fig. 21, straight lengths of my new brush strip may be inserted axially into a plurality of channels 67 welded together in side-by-side relationship, such channels being provided with indented lugs 68 adapted to engage the edges of the channelform backs 20 of the brush strip to secure the latter therein. For further details of this general type of assembly, reference may be had to my co-pending application Serial No. 183,749, filed September 8, 1950, now Patent 2,789,298. It will be understood that the resultant brush assembly will have a generally flat work-engaging face.

Referring now to Fig. 22 of the drawing, the lengths of my new brush strip may be utilized to form a rotary brush assembly of desired and normally rather gentle transversely curved contour, the channelform backs 20 of the lengths of brush strip being inserted and retained in channelform clips 69 mounted on discs 70 carried by shaft 71 as explained more in detail in my co-pending application Serial No. 195,011, filed November 10, 1950, now Patent 2,773,275. In this embodiment, the lengths of brush strip extend generally parallel to the axis of shaft 71 although they may also be of long lead helical pitch.

Brushes and brush elements produced in accordance with my invention are particularly suited for a variety of purposes. When using hard brush material such as Hadfield steel, a scraping action is obtained quite different from the action of the ordinary round wire brush material, and such action has been found to be most efficient in removing soft metal from weld surfaces of castings, for example, without the usual tendency of the brush material also to enter into the weld hollows and therefore remove more metal than desired. Brushes of this type are effective in removing scale from billets, steel strip and the like, both hot and cold. Annular or helical sections such as generally illustrated in Fig. 20 may be utilized in pipe cleaning pigs of well-known construction. When similar annular or helical sections are mounted for rotation about their axes, an edgewise shredding action is thereby obtained. On the other hand, when various fabric buff materials are utilized and the resultant buff strip mounted extending generally parallel to the axis of rotation as shown in Fig. 22, for example, the flat side faces of the buff material may be caused to act upon the work to afford an unusually "soft" buffing action. As previously indicated, such buff material may have abrasive particles adhered thereto, if desired.

While austenitic manganese steel (Hadfield's manganese steel) has been found particularly useful for employment in rotary brushes in accordance with my invention, it will be understood that various other metal strip or sheet materials are suitable to form the brushing fingers for many purposes. Such fingers are preferably formed by cutting the sheet material inwardly from its longitudinal edge or edges, forming slits or slots or combinations of the same between such fingers.

In effect, the teeth 23 and 24 project inwardly between the flat brushing fingers, through either the slits, slots, or holes in which the slits terminate. Holes may be punched intermediate such slits or cuts for insertion of the teeth but this is ordinarily neither necessary nor desirable.

Even very hard sheet materials such as Hadfield steel suitable for use in accordance with my invention are not as hard as commercially available granular abrasives such as Carborundum and emery and I may therefore modify my new brush material for efficient application of such abrasives. It is a common practice in the art to apply granular or powdered abrasives of this type to rotating brushes utilizing standard brush materials such as Tampico fiber, wire, and the like, the abrasive ordinarily being in the form of a "grease stick" which may be intermittently brought into contact with the brush face. This procedure is, of course, quite wasteful and messy and fails to apply the abrasive to the work as efficiently as may be desired. In my co-pending application Serial No. 58,670 filed November 6, 1948, now Patent 2,682,734, I teach the production and use of rotary brushes having plastic coated brush material strands in which coatings powdered abrasive materials may be contained or embedded. It is, however, rather difficult firmly to bond the larger sizes of abrasive granules to individual brush material filaments or strands, and there is likely to be excessive loss of such material in use. When however, such material is bonded to the relatively large flat surfaces of the novel brush material of this invention, large quantities may be thus secured in effective working position and the individual grains of abrasive even when of relatively large size are not readily dislodged and lost in use. Furthermore, it is possible to nest two or more sets of my flat brushing fingers with the abrasive material adhered therebetween in a sort of "sandwich" where it is protected from premature dislodgment but made available in a most effective manner at the ends of such composite fingers constituting the brushing face of the tool.

Now referring more particularly to Figs. 23-30 inclusive, granular abrasive may be adhered to the respective end portions 72 and 73 of a length of thin strip material 74 such as Hadfield steel, for example, and two such strips deformed to general V-shape and nested as shown in Fig. 24 with their abrasive coated portions opposed and bonded together. Desirably, the surfaces of the metal strips to which the abrasive is to be adhered will first be coated with a bonding agent such as "Ty-Ply-S" (Vanderbilt) and then with an abrasive bearing plastic such as polyvinyl plastic containing granular aluminum oxide or silicon carbide, for example. After assembly as shown in Fig. 24, the resultant composite brushing fingers may be clamped in assembled position and baked in an oven to cure the plastic. Not only is the abrasive thus made available at the working face of the brush in a most effective manner but also the action of the metal fingers themselves is enhanced due to the conjoint effect of the two thin pieces of sheet material which reinforce one another, afford more working edges, and provide twice the skin effect of a comparable single thicker strip of metal. When utilizing hard, low damping capacity material, such as Hadfield steel, the plastic containing the abrasive also serves to dampen the vibration of the metallic elements in use.

Various modifications of the above-described construction are feasible and desirable on occasion. Thus, as shown in Fig. 25, abrasive 75 may also be adhered to the exposed surfaces of the composite fingers and the entire assembly may thereafter be dipped in or sprayed with the plain plastic to afford a thin corrosion-preventing outer coating which also assists in damping vibration.

Further protection and reinforcement may be provided by adhering a layer of flexible sheet material 76, which may be of glass fiber fabric, for example, to the exposed surfaces of the composite fingers of either Fig. 24 or Fig. 25, such fabric desirably having been coated or impregnated with a suitable plastic bonding agent to adhere the same to the fingers and also to afford additional protection to the underlying elements. Such plastic coated fabric will tend to prevent corrosion of the metal parts and will also assist in retaining the abrasive layers in place.

A convenient way of assembling and curing such novel brush elements is illustrated in Fig. 27. A layer of the plastic coated fabric 76 is first placed over an aluminum bar 77 of inverted V-shaped profile corresponding to that of the metal fingers 74, with the plastic coated side of the fabric up, and a series of such finger assemblies are arranged in side-by-side relationship upon such fabric and another layer of the plastic coated fabric 76 is placed over all. An aluminum bar 78 having a V-shaped groove 79 therein is next clamped over bar 77 with the assembled layers thereon and placed in a curing oven to cure the plastic. When bar 78 is thereafter removed, the assembled brushing elements may be stripped from bar 77 and the fabric layers may be severed between the sets of metal strips to form individual fingers as shown in Fig. 26, or such fabric may be left unsevered in the region at the apex of the V structure so that the fingers will remain interconnected to facilitate feeding to a brush strip machine where they may be secured within a continuous channelform back as explained above.

In another modification, composite fingers of the Fig. 24 type may be arranged on bar 77 in slightly spaced apart relationship and a relatively narrow strip of plastic coated fabric 80 bonded thereto along the apices of the V-shaped structures as illustrated in Fig. 28. The spaces 81 between the fingers facilitate insertion of the teeth of the channelform brush back if such teeth are employed, and the fabric strip 80 serves to interconnect the fingers for ease of handling during assembly into the brush back. Such flexible interconnection of the brushing fingers moreover serves to maintain the latter in proper relationship so that an absolutely uniform density of fill is obtained in the finished brush. Of course, as explained above, the fingers of the Fig. 28 embodiment may be coated with plastic to inhibit corrosion, etc., if desired, and additional abrasive may be adhered to the exposed surfaces of the fingers as well as sandwiched between the superimposed components thereof.

Fig. 29 illustrates a finger assembly of the general type shown in Fig. 26 where the fabric layers 76 have been severed intermediate the respective fingers except in the region 82 of the bend where such fabric has been left uncut to connect the fingers in a continuous chain. Such interconnection of the fingers in this region will not interfere with circularization of the final brush element as shown in Fig. 20, for example, and such fingers may be thus arranged in any suitable brush back or support.

Fig. 30 represents a cross-section through an outer end portion of a finger structure as shown in Fig. 26, for example, on an enlarged scale, better to show the arrangement of the several layers. It will be appreciated that the abrasive regions may be confined more nearly to the outer end portions of the fingers or may extend the entire length of such fingers. For ordinary purposes, however, I have found that such abrasive regions should desirably extend only a little more than one-half the length of the fingers from the outer ends thereof since when the fingers have worn back to such point the tool will ordinarily be discarded. By providing such abrasive regions on the outer portions of the fingers only, such outer portions will obviously be appreciably thicker than the inner portions affording a comparably more dense brush face, a particularly important feature when such fingers are arranged to extend radially in the manner illustrated in Fig. 20, for example.

It will be understood that instead of the fiber glass cloth 76, various other types of flexible sheet material may be utilized including plastic impregnated muslin, certain plastic sheet materials, kraft paper and the like. Suitable plastics for bonding the abrasive and impregnating the outer fabric layers include nylon (polyamide resins), vinyl plastics (vinyl polymers and copolymers), and trifluorochloroethylene polymers. Neoprene (polychloroprene) and Hycar (modified copolymers of butadiene and acrylonitrile) as well as rubber and the melamine resins (melamine-formaldehyde reaction products) may be employed in some cases, particularly when compounded to exhibit properties similar to those of nylon.

Typical examples of suitable abrasives for use in accordance with my invention include:

Aluminum oxide ("Alundum," "Aloxite")
Silicon carbide ("Carborundum," "Corundum")
Chrome oxide
Natural abrasives (e.g. pumice, emery)
Various mixtures of the above The aluminum oxides are particularly suitable where good abrasive action combined with the production of a relatively good finish is desired. The silicon carbides make hard and sharp abrasives for maximum cutting action, and it is contemplated that abrasives of this general type will most frequently be employed.

When a plurality of individual sets of fingers are interconnected by a continuous strip of fabric or the like at their bases (Figs. 28 and 29), such sets of fingers may be slightly spaced apart as at 81 for insertion of the teeth 25 punched inwardly from a channelform back or such sets of fingers may additionally or alternatively have notches such as 83 (Fig. 28) punched in their edges to form somewhat larger openings corresponding to holes 9 to facilitate insertion of such teeth. However, as explained in conjunction with the description of Figs. 18 and 19, it is not always essential that teeth be utilized to secure the brushing elements in the brush back or support.

Furthermore, it will be understood that, when desired, other types of strip material may be utilized rather than the very hard steels such as Hadfield steel in the construction of brushing elements of the type shown in Figs. 23–30 inclusive including glass fiber fabrics, plastic sheet material such as nylon, and various thin metal strip materials including spring steel, Monel metal, silicon bronze, etc., depending upon the particular characteristics desired.

Similarly, the thin sheet material fingers 15 and 16 formed by slitting strips of sheet material as shown in Figs. 3 and 4, for example, may have abrasive adhered thereto and may be sandwiched together in a plurality of layers. The individual pairs of fingers joined together as in Figs. 28 and 29, however, constitute a more flexible ensemble.

The term "brush" as used herein and in the claims is employed in a broad sense inasmuch as the characteristics of my new tool may be rather different from those ordinarily associated with such term. Similarly, the term "fabric" as applied to material 76 and 80, for example, is intended to include not only textile fabrics but also other flexible sheet material such as paper and various plastics.

Other modes of applying the principle of the invention may be employed, change being made as regards the details described, provided the features stated in any of the following claims or the equivalent of such be employed.

I therefore particularly point out and distinctly claim as my invention:

1. As a new article of manufacture, an elongated brush element comprising a sheet metal channelform back, brush material secured therein and extending therefrom, said brush material comprising a length of thin flat metal strip folded along its longitudinal center line with the portion in the region of such fold inserted and secured in said channelform back, a row of holes punched in such portion of said strip on each side of such center line, and teeth punched in from the respective sides of said channelform back projecting inwardly through corresponding holes of such rows to assist in securing said folded strip, said folded strip being slit inwardly from its respective longitudinal side edges with such slits extending to corresponding adjacent holes of such rows to provide a plurality of individual flat brushing fingers.

2. As a new article of manufacture, an elongated brush element comprising a sheet metal channelform back, brush material secured therein and extending therefrom, said brush material comprising a length of thin flat metal strip folded along its longitudinal center line with the portion in the region of such fold inserted and secured in said channelform back, said folded strip being slotted inwardly from its respective longitudinal side edges at a plurality of spaced points therealong with such slots extending into such region within said back, thereby providing a plurality of slightly spaced individual flat brushing fingers, and teeth projecting inwardly from the sides of said back through such slots to assist in securing said strip.

3. As a new article of manufacture, an elongated brush element comprising a sheet metal channelform back, brush material secured therein and extending therefrom, said brush material comprising a length of thin flat metal strip folded along its longitudinal center line with the portion in the region of such fold inserted and secured in said channelform back, a row of holes punched in such portion of said strip on each side of such center line, the holes of one row being staggered relative to the holes of the other row, and teeth projecting inwardly from the sides of said back through corresponding holes of such rows to assist in securing said folded strip, said folded strip being slit inwardly from its respective longitudinal side edges with such slits extending to corresponding adjacent holes of such rows to provide a plurality of individual flat brushing fingers, the fingers to one side of such fold being thus staggered relative to the fingers to the other side of such fold.

4. As a new article of manufacture, an elongated brush element comprising a sheet metal channelform back, brush material secured therein and extending therefrom, said brush material comprising a length of thin flat metal strip folded along its longitudinal center line with the portion in the region of such fold inserted and secured in said channelform back, said folded strip being slotted inwardly from its respective longitudinal side edges with the slots extending from one such edge being staggered relative to the slots extending from the other such edge and extending beyond such longitudinal center line in such region within said back, thereby providing a plurality of slightly spaced individual flat brushing fingers, and teeth projecting inwardly from the sides of said back through such slots to assist in securing said strip.

5. As a new article of manufacture, an elongated brush element comprising a sheet metal channelform back, brush material secured therein and extending therefrom, said brush material comprising a length of thin flat metal strip folded along its longitudinal center line with the portion in the region of such fold inserted and secured in said channelform back, a row of holes punched in such portion of said strip on each side of such center line, the holes of one row being staggered relative to the holes of the other row, and teeth projecting inwardly from the sides of said back through corresponding holes of such rows to assist in securing said folded strip, said folded strip being slit inwardly from its respective longitudinal side edges with such slits extending to holes of the row on the opposite side of such center line to provide a plurality of individual flat brushing fingers, the fingers to one side of such fold being thus staggered relative to the fingers to the other side of such fold.

6. As a new article of manufacture, an elongated brush element comprising a sheet metal channelform back, brush material secured therein and extending therefrom, said brush material comprising a length of thin flat metal strip folded along its longitudinal center line with the portion in the region of such fold inserted and secured in said channelform back, a row of holes punched in such portion of said strip on each side of such center line, the holes of one row being staggered relative to the holes of the other row, and teeth projecting inwardly from the sides of said back through corresponding holes of such rows to assist in securing said folded strip, said folded strip being slotted inwardly from its respective longitudinal side edges with such slots continued as slits extending to holes of the row on the opposite side of such center line to provide a plurality of individual flat brushing fingers, the fingers to one side of such fold being thus staggered relative to the fingers to the other side of such fold.

7. As a new article of manufacture, an elongated brush element comprising a sheet metal channelform back, brush material secured therein and extending therefrom, said brush material comprising a length of thin flat metal strip folded along its longitudinal center line with the portion in the region of such fold inserted and secured in said channelform back, said folded strip being slit inwardly from its respective longitudinal side edges with the slits extending from one such edge being staggered relative to the slits extending from the other such edge and being widened to form transverse slots extending beyond such longitudinal center line in such portion within such channel, a wire retaining member disposed longitudinally within said back and overlying such folded portion of said strip, and teeth projecting inwardly from the sides of said back through such slots and overlying said wire.

8. As a new article of manufacture, an elongated brush element comprising a sheet metal channelform back, such channel having a constricted opening between the channel side edges, brush material secured therein and extending therefrom, said brush material comprising a length of thin flat metal strip folded along its longitudinal center line with the portion in the region of such fold inserted and secured in said channelform back, said folded strip being cut inwardly from its respective longitudinal side edges to form a plurality of flat brushing fingers, and a wire retaining member disposed longitudinally within said channel and overlying such folded portion of said strip adapted to secure the latter in said back.

9. As a new article of manufacture, an elongated brush element comprising a sheet metal channelform back, such channel having a constricted opening between the channel side edges, brush material secured therein and extending therefrom, said brush material comprising a length of thin flat spring metal strip folded in the region of its longitudinal center line with the portion in such region inserted in said channelform back, said folded strip being cut inwardly from its respective longitudinal side edges to form a plurality of flat brushing fingers, said folded strip being retained in said channelform back by its natural resilient spreading action.

10. As a new article of manufacture, an elongated brush element comprising a sheet metal channelform back, brush material secured therein and extending therefrom, said brush material comprising a length of thin flat metal strip folded along its longitudinal center line with the portion in the region of such fold inserted and secured in said channelform back, a row of holes punched in such portion of said strip on each side of such center line, and teeth punched in from the respective sides of said channelform back projecting inwardly through corresponding holes of such rows to assist in securing said folded strip, said teeth being bent over to engage the inner face of said strip, and said folded strip being cut inwardly from its respective longitudinal side edges with such cuts extending to corresponding holes of such rows to provide a plurality of individual flat brushing fingers.

11. As a new article of manufacture, an elongated brush element comprising a sheet metal channelform back, brush material secured therein and extending therefrom, said brush material comprising a length of thin flat metal strip folded along its longitudinal center line with the portion in the region of such fold inserted and secured in said channelform back, a row of holes punched in such portion of said strip on each side of such center line, and teeth punched in from the respective sides of said channelform back projecting inwardly through corresponding holes of such rows to assist in securing said folded strip, said folded strip being cut inwardly from its respective longitudinal side edges with such cuts extending to corresponding holes of such rows to provide a plurality of individual brushing fingers, said fingers being crimped to reduce concentrations of stress in use.

12. As a new article of manufacture, an elongated brush element comprising a sheet metal channelform back, brush material secured therein and extending therefrom, said brush material comprising a plurality of superimposed lengths of thin flat metal strip folded along their longitudinal center lines with the portions in the region of such folds inserted and secured in said channelform back, a row of holes punched in such portions of said strip on each side of such center lines, and teeth projecting inwardly from the respective sides of said channelform back through corresponding holes of such rows to assist in securing said folded lengths of strip, said folded lengths of strip being cut inwardly from their respective longitudinal side edges with such cuts extending to corresponding holes of such rows to provide a plurality of individual flat brushing fingers.

13. As a new article of manufacture, a brush element comprising a channel back and brush material secured therein and extending therefrom, said brush material comprising thin flat metal strip folded with the region including such fold inserted in such channel, said strip being cut inwardly from its respective side edges to form a plurality of thin flat brushing fingers, and teeth projecting inwardly from a side of said channel back adapted to engage said strip intermediate said fingers to secure the same in said back.

14. As a new article of manufacture, an elongated brush element comprising a sheet metal channelform back, brush material secured therein and extending therefrom, said brush material comprising a length of spring steel strip folded along its longitudinal center line with the portion in the region of such fold inserted and secured in said channelform back, a row of holes punched in such portion of said strip on each side of such center line, and teeth punched in from the respective sides of said channelform back projecting inwardly through corresponding holes of such rows to assist in securing said folded strip, said folded strip being slit inwardly from its respective longitudinal side edges with such slits extending to corresponding adjacent holes of such rows to provide a plurality of individual flat brushing fingers.

15. As a new article of manufacture, a brush element comprising a channel back and brush material secured therein and extending therefrom, said brush material comprising layers of thin flat metal strip secured in said channel back and slit to provide a plurality of flat brushing fingers, and layers of relatively soft non-metallic sheet material interposed between said layers of metal strip and secured in said back with said fingers extending freely therefrom.

16. As a new article of manufacture, an elongated brush element comprising a sheet metal channelform back, brush material secured therein and extending therefrom, said brush material comprising a length of flexible sheet material in the form of a strip folded along its longitudinal center line with the portion in the region of such fold inserted and secured in said channelform back, a row of holes punched in such portion of said strip on each side of such center line, and teeth punched in from the respective sides of said channelform back projecting inwardly through corresponding holes of such rows to assist in securing said folded strip, said folded strip being slit inwardly from its respective longitudinal side edges with such slits extending to corresponding adjacent holes of such rows to provide a plurality of individual flat brushing fingers.

17. As a new article of manufacture, a rotary brush comprising a rotatable support and thin flat sheet metal fingers extending therefrom, said fingers lying in planes generally normal to the axis of rotation of said support.

18. As a new article of manufacture, a rotary brush comprising a length of brush strip having a sheet metal channelform back, brush material secured therein and extending therefrom, said brush material comprising a length of thin flat metal strip folded along its longitudinal center line with the portion in the region of such fold inserted and secured in said channelform back, said folded strip being cut inwardly from its respective side edges with the cuts extending from one such edge being staggered relative to the cuts extending from the other such edge, such cuts forming transverse slots extending beyond such longitudinal center line in such portion within such channel, and said brush strip being circularized with the resultant flat fingers lying in planes generally normal to the axis of circularization.

19. As a new article of manufacture, brush strip comprising a sheet metal channel back and brush material extending therefrom, said brush material comprising a length of thin sheet metal strip cut inwardly from its respective side edges to form two rows of flat fingers joined in the general region of the longitudinal center line of said strip, said strip being deformed longitudinally of such region with said rows of flat fingers extending in generally side-by-side relationship and such deformed portion inserted and secured in said channel back.

20. A rotary brush comprising a rotatable support and a plurality of thin flat sheet metal fingers extending therefrom, said fingers having granular abrasive adhered thereto, and fabric sheet material bonded to flat surfaces of said fingers and overlying and protecting said abrasive.

21. A brushing tool comprising a support and a plurality of flat fingers extending therefrom, said fingers comprising strips of smooth sheet material bonded together with granular abrasive sandwiched therebetween.

22. A brushing tool comprising a support and a plurality of flat fingers extending therefrom, said fingers comprising thin strips of resilient sheet metal bonded together, with abrasive bonded thereto and sandwiched therebetween.

23. A brushing tool comprising a support and a plurality of flat fingers extending therefrom, said fingers comprising thin strips of resilient sheet metal bonded together, with granular abrasive bonded thereto both on their exposed outer surfaces and sandwiched therebetween.

24. A brushing tool comprising a support and a plurality of flat fingers extending therefrom, said fingers comprising thin strips of resilient sheet metal bonded together with resilient plastic, granular abrasive included in such plastic between said sheet metal strips and also bonded to the outer surfaces thereof, and fabric sheet material bonded to such outer surfaces and overlying such abrasive thereon.

25. A brushing tool comprising a channel support and brush material secured in such channel and extending therefrom, said brush material comprising pairs of flat fingers of resilient sheet metal integrally joined at their inner ends where secured in such channel and extending in general side-by-side relationship therefrom, and granular abrasive bonded to flat surfaces of said fingers.

26. A brushing tool comprising a channel support and brush material secured in such channel and extendinng therefrom, said brush material comprising thin flat strips of resilient sheet metal folded midway of their length with the region including such fold secured in such channel, and a strip of flexible material within such channel secured to and interconnecting the folded portions of said metal strips.

27. A brushing tool comprising a channel support and brush material secured in such channel and extending therefrom, said brush material comprising flat brushing fingers folded midway of their length with the region including such fold secured in such channel, said fingers comprising two thin flat strips of resilient sheet metal bonded together in their outer end portions, with abrasive sandwiched and secured therebetween.

28. A brushing tool comprising a channel support and brush material secured in such channel and extending therefrom, said brush material comprising flat brushing fingers folded midway of their length with the region including such fold secured in such channel, said fingers comprising two thin flat strips of resilient sheet metal bonded together in their outer end portions, with abrasive sandwiched and secured therebetween and also bonded to outer surfaces of said strips, and fabric sheet material bonded to such outer surfaces and overlying such abrasive thereon.

29. The method of manufacturing a brush element which comprises forming flat strips of sheet metal to general V-shape, interconnecting such strips with a continuous flexible element secured thereto in the regions of their bends to form a flexible chain of double brushing fingers, and securing such fingers in a channel support in the regions of such bends with the respective ends of such fingers extending therefrom.

30. The method of manufacturing a brush element which comprises forming flat strips of sheet metal to general V-shape, interconnecting such strips with a continuous flexible element secured thereto in the regions of their bends to form a flexible chain of double brushing fingers, securing such fingers in a sheet metal channel support in the regions of such bends with the respective ends of such fingers extending therefrom, and circularizing the brush strip thus produced, the flexing of such continuous element intermediate such fingers facilitating such circularization.

31. The rotary brush of claim 17 wherein said thin flat fingers extend individually radially from a central rotatable support and are of hard metal sheet material of much greater width than its thickness.

References Cited in the file of this patent

UNITED STATES PATENTS

| | | |
|---|---|---|
| 339,585 | Root | Apr. 6, 1886 |
| 864,922 | Saltiel | Sept. 3, 1907 |
| 865,098 | Gaudron | Sept. 3, 1907 |
| 1,897,971 | Johnston | Feb. 14, 1933 |
| 1,906,766 | Ray | May 2, 1933 |
| 1,922,108 | Myers et al. | Aug. 15, 1933 |
| 2,049,324 | Schneider | July 28, 1936 |
| 2,291,524 | Best | July 28, 1942 |
| 2,316,257 | Krastin | Apr. 13, 1943 |
| 2,324,050 | Shelley | July 13, 1943 |
| 2,400,809 | Cave | May 21, 1946 |